(12) United States Patent
Lin et al.

(10) Patent No.: US 8,331,963 B1
(45) Date of Patent: Dec. 11, 2012

(54) ENABLING RETRIEVAL OF A MOBILE MESSAGING SERVICE MESSAGE FROM MULTIPLE DEVICES ASSOCIATED WITH A SINGLE MOBILE DIRECTORY NUMBER

(75) Inventors: Zhijian Lin, Dublin, CA (US); Amir Mayblum, Walnut Creek, CA (US); Ning-Chia Yeh, Dublin, CA (US); Chong Wang, Castro Valley, CA (US); Heather Goodson, Lafayette, CA (US); Jerry Kupsh, Concord, CA (US)

(73) Assignee: Cellco Partnership D/B/A Verizon Wireless, Basking Ridge, NJ (US)

( * ) Notice: Subject to any disclaimer, the term of this patent is extended or adjusted under 35 U.S.C. 154(b) by 0 days.

(21) Appl. No.: 13/343,496

(22) Filed: Jan. 4, 2012

(51) Int. Cl.
*H04W 4/20* (2009.01)
(52) U.S. Cl. .................... 455/466; 455/435.1
(58) Field of Classification Search .................. 455/466, 455/435.1, 433, 518
See application file for complete search history.

(56) References Cited

U.S. PATENT DOCUMENTS

2006/0211423 A1* 9/2006 Ejzak et al. .................. 455/445
2011/0165905 A1* 7/2011 Shuman ...................... 455/518

OTHER PUBLICATIONS

The Digital Solution, "Sidekick 4G: Speedier Socializing," All Things Digital, <http://allthhingsd.com/?p=68718&ak_action=printable>, accessed Dec. 21, 2011.
"Multi-Screen Access to Your Conversations," AT&T Messages Android Application Streamlines Communication, <http://www.att.com/gen/press-room?pid=21023>, accessed Dec. 21, 2011.

* cited by examiner

*Primary Examiner* — Phuoc Doan (57) ABSTRACT

A method that enables provisioning of mobile station messages to multiple devices associated with the sender and/or receiver includes receiving, at a mobile messaging service center, a mobile messaging service message; identifying a destination mobile station associated with the received message, the destination mobile station having a Mobile Directory Number and corresponding to a primary device of a customer of a mobile communication network provider; and delivering, through a mobile communication network, the received message to the primary device of the customer. The method also includes steps of determining whether the customer subscribes to a Messaging Anywhere (MA) service; upon determination that the customer subscribers to the MA service, delivering, from the mobile messaging service center, a copy of the received message to an MA server; and delivering, from the MA server, the message to a secondary device previously identified by the customer.

17 Claims, 4 Drawing Sheets

ENABLING RETRIEVAL OF A MOBILE MESSAGING SERVICE MESSAGE FROM MULTIPLE DEVICES ASSOCIATED WITH A SINGLE MOBILE DIRECTORY NUMBER

BACKGROUND

A communication device such as a cell phone may be able to communicate with one or more other devices through a cellular network of a carrier with which the user of the device has an account. A variety of different types of services may be offered by the carrier to this end, including services that permit a messaging service message (e.g., Short Message Service (SMS), Multimedia Messaging Service (MMS), and Rich Communication Suite (RCS) service) to be transmitted from/to the device through the carrier's cellular network. However, problems exist in the current messaging service. For example, once messages are delivered to the user's cell phone, the messages are not stored in the carriers' network for future access by the user, e.g., due to storage requirements within the network. Thus, if the message is lost (e.g., the user accidentally deletes the message), it is irretrievable by the network. Complications for messaging also ensue due to different users having accounts with different carriers, and thus messages between users being transmitted through different cellular networks. For example, a user cannot retrieve message history from devices other than the cell phone or from networks other than the carrier's cellular network. In contrast, many email services (e.g. hotmail, gmail, etc.) enable users to access their emails from variety of devices using the Internet.

As messaging products evolve, it is desirable for wireless carriers to provide functionality similar to that of email services so that users can enjoy the simplicity of SMS and MMS messages, and have the flexibility of typical email services in accessing the users' SMS and MMS messages. Specifically, there is a need for a system to provide functionality for users to send and receive messages (SMS, MSS, and RCS) on multiple devices associated with a single Mobile Directory Number (MDN).

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A Messaging Anywhere (MA) service provided by a MA server of the mobile communication network provider enables a customer of the mobile communication network to send and receive mobile messaging service messages (e.g., SMS, MMS, and RCS) on both a primary device and secondary device of the customer, each device being associated with a single MDN. In one example, the primary device is a mobile station of the customer having a specific MDN. The secondary device may be any other device that is logged into the mobile communication network and is associated with the same MDN as the primary device. For example, the secondary device includes a personal computer of the customer. The customer may use the browser on the customer's personal computer to log into the mobile communication network and establish a session with a MA server of the mobile communication network. The MA server may recognize the secondary device is associated with the primary device based on the MDN gleaned from the authentication information provided by the customer.

The MA service allows for storage of the mobile messaging service messages in the mobile communication network for future access by the customer. The customer can therefore send and receive messages or retrieve message history from devices other than the customer's mobile station used to send/receive the message. To this end, the customer can enjoy the simplicity of SMS, MMS, and RCS messages, and have the flexibility of typical email services in accessing the customer's SMS, MMS, and RCS messages. The customer of the mobile communication network may have to be provisioned in order to utilize MA services provided by the mobile communication network provider.

The customer may subscribe to MA services in the following manners: (i) the customer may subscribe to MA services in a store of the mobile communication network provider or during a call to a Customer Sales Representative (CSR) of the mobile communication network provider; (ii) the customer may self-subscribe himself/herself as an MA subscriber by using a browser on the customer's personal computer to access the customer's account on the mobile communication network provider; and (iii) the customer may self-subscribe himself/herself as an MA subscriber via a messaging client stored on the mobile station of the customer. In any case, after subscription to the MA service, the customer can send and receive messages or retrieve message history from devices other than the customer's mobile station used to send/receive the message.

To illustrate a few examples, when a mobile messaging service message (e.g., SMS, MMS, and RCS) is sent to a primary device (e.g., a mobile station) of the customer, the message is received at a mobile message service center (e.g., Short Message Service Center (SMSC), Multimedia Message Service Center (MMSC), or Converged Message Service Center (CMSC)) of the mobile communication network. The mobile message service center identifies the destination of the message and delivers the message to its intended destination (e.g., primary device of the customer). The mobile message service center also determines whether the customer sending and/or the customer receiving the message subscribes to the MA services. The mobile message service center may determine this based on the MDNs in the message identifying the source and the destination of the message. Upon determination that the customer receiving the message subscribes to the MA services, the mobile message service center also delivers a copy of the message to the MA server for delivery to the secondary device of the customer. The MA server receives the message and stores it in a Message Store database. The Message Store database can be a relational database, for example an Oracle database, a MySQL database; or a NOSQL database such as a Cassandra database, or a HBase database. The interface between the MA server and the Message Store database can use a SQL, HTTP, IMAP, or other appropriate protocol. The messages may be retained in the Message Store database for a specific period of time and thereafter the messages may be deleted to provide additional space for new messages. In one example, the messages are deleted after delivery of the messages to all devices identified by the customer. In another example, the messages are deleted after the messages reach a particular age. In yet another example, the messages are deleted after a predetermined amount of storage is consumed by the Message Store database.

The MA server then delivers the message to the secondary device of the customer when the secondary device is authenticated by the mobile communication network over the Internet.

In another example, instead of receiving a mobile messaging service message (e.g., SMS, MMS, and RCS) on the primary device, the customer utilizes the primary device to send a message to another device (e.g., another mobile station). Once sent, the message is received at the mobile message service center. The mobile message service center identifies the destination of the message and delivers the message to its intended destination (e.g., mobile station associated with the MDN identified in the header of the message). The mobile message service center also determines whether the customer sending and/or the customer receiving the message subscribes to the MA services. The mobile message service center may determine this based on the MDNs in the message identifying the source and the destination of the message. Upon determination that the sender subscribes to the MA services, the mobile message service center sends a copy of the message to the MA server, which may notify the secondary device associated with the customer to synchronize with the MA server to receive a copy of the sent message from the primary device. Upon determination that the receiver of the message also subscribes to the MA services, the mobile message service center sends a copy of the message to the MA server for the delivery to the secondary device of the customer associated with the mobile device receiving the message.

Figure 1:
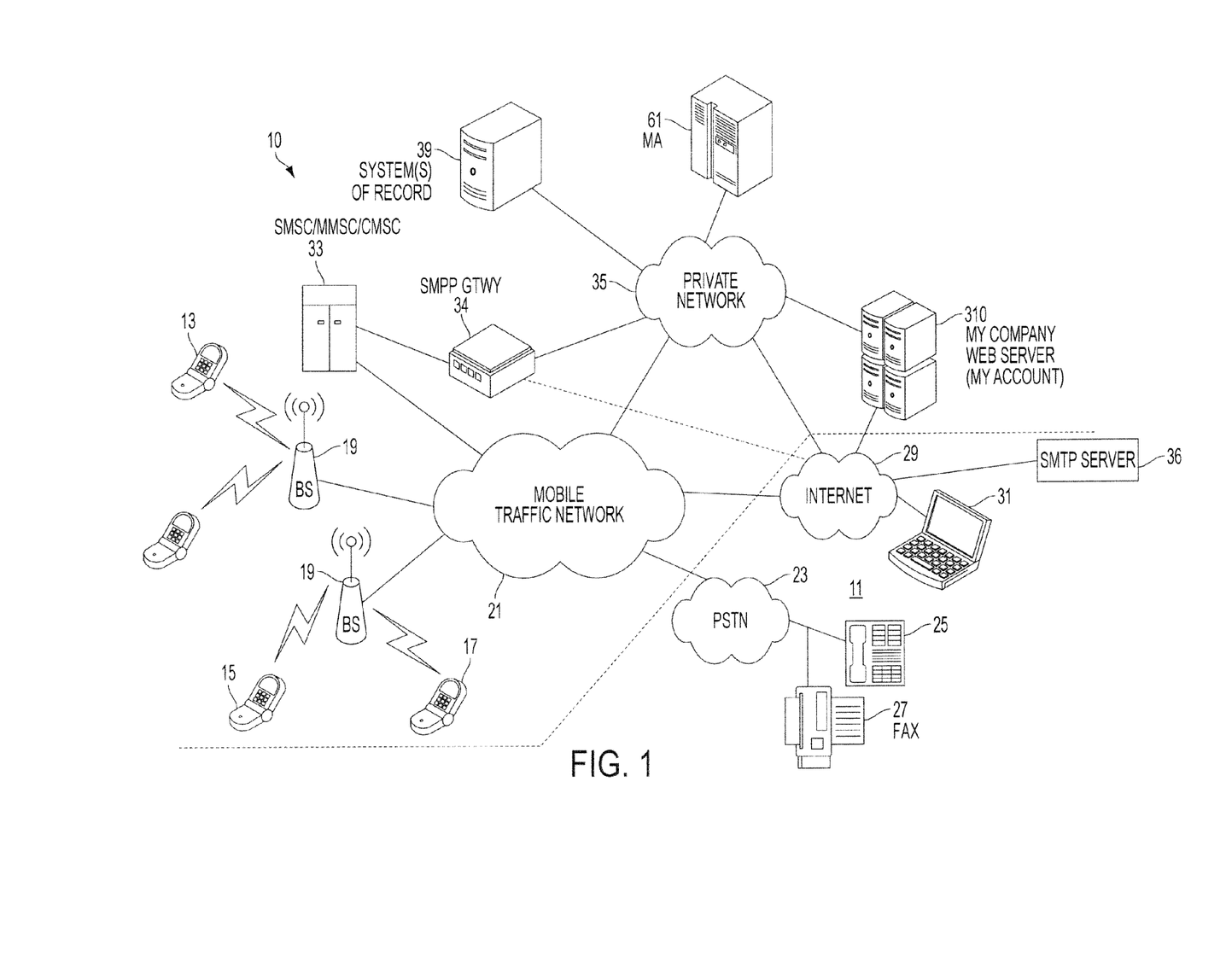
FIG. 1 illustrates a functional block diagram useful in understanding networked elements/systems that may be used in allowing a subscriber of a mobile communication network provider to receive a mobile messaging service message (e.g., SMS, MMS, and/or RCS) on multiple devices associated with a single Mobile Directory Number.

With this overview, the MA functionalities and notification will be described in more detail with respect to the following figures. FIG. 1 illustrates a functional block diagram useful in understanding networked elements/systems that may be used in allowing a subscriber of a mobile communication network provider to receive a mobile messaging service message (e.g., SMS, MMS, and RCS) on multiple devices associated with a single MDN. A mobile communication network 10 may be operated by a carrier or service provider to provide a wide range of mobile communication services and ancillary services or features to its subscriber customers and associated mobile station ("MS") users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations within networks and stations 11 outside the mobile communication network 10.

For purposes of later discussion, several mobile stations appear in the drawing, to represent examples of the mobile stations that may receive various services via the mobile communication network 10. Today, mobile stations typically take the form of portable handsets, smart-phones or personal digital assistants, although they may be implemented in other form factors. For discussion of some of the notification scenarios, we will assume that (i) the mobile station 13 having a first MDN corresponds to the primary device of the customer and is covered under the customer's account reflected as subscribing to MA services. The PC 31 corresponds to the secondary device of the customer and is logged into the network and associated with the first MDN. The mobile station 17 has a second MDN different from that of mobile station 13 and is under a different subscriber account, one that does not subscribe to MA services.

The network 10 allows users of the mobile stations to initiate and receive telephone calls to each other as well as through the public switched telephone network ("PSTN") and telephone stations 25 connected thereto. The network 10 allows SMS, MMS, and RCS type text messaging between mobile stations and similar messaging with other devices via the Internet. The network 10 typically offers a variety of other data services via the Internet, such as downloads, web browsing, email, etc.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements, such as the SMSCs, MMSCs, and/or CSMCs. A regional portion of the network 10, such as that serving mobile stations 13, 17 typically include one or more RANs and a regional circuit and/or packet switched network and associated signaling network facilities.

Physical elements of a RAN operated by one of the mobile service providers or carriers include a number of base stations represented in the example by the base stations (BSs) 19. Although not separately shown, such a base station 19 typically comprises a base transceiver system ("BTS") which communicates via an antennae system at the site of base station and over the airlink with one or more of the mobile stations 13, 17 when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The mobile communication network 10 has multiple radio access networks, which include a traffic network portion (also referred to herein as a traffic network or mobile traffic network) represented generally by the cloud 21 in FIG. 1, which carries the user communications for the mobile stations 13, 17 between the base stations and other elements with or through which the mobile stations communicate. Individual elements such as switches and/or routers forming the traffic network 21 are omitted here for simplicity.

An MDN or Mobile Telephone Number ("MTN") is the telephone number assigned to a mobile station by the carrier, which a calling party or device provides in order to call or send a message to the particular mobile station. To call the mobile station 15, for example, a user of a PSTN telephone or of another mobile station dials the MDN (or provides an alias) associated with the mobile station 15. To send a RCS message, a MMS message, or a SMS message to destination mobile station 15, as another example, typically entails input of the MDN (or again associated alias) of that mobile station. A Mobile Identification Number ("MIN") is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations and is the number or address of the mobile station that appears in billing and account records and is accessible via web site or call-in account services.

The traffic network portion 21 of the mobile communication network 10 connects to a PSTN 23. This allows the network 10 to provide voice grade call connections between mobile stations and regular telephones connected to the PSTN 23. The drawing shows one such telephone at 25. For purposes of discussing notifications, some notifications may entail voice message delivery or even service representative calls to the account holder, for example, at a regular telephone such as telephone 25 via the PSTN 23. The PSTN 23 also provides connections to other types of customer premises equipment, such as facsimile or 'FAX' machines. The drawing shows one FAX machine 27, by way of example, to illustrate the point that a subscriber or account holder notification may entail a facsimile transmission of the notification message to the subscriber's FAX machine, such as the machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, email, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer ("PC") at 31, by way of example. For purposes of discussing notifications, some notifications may entail a mobile messaging service message (e.g., SMS, MMS, and RCS) from the primary device (e.g., mobile station 13) of the customer to another mobile station (e.g., mobile station 17) of another customer. The message may be delivered to the mobile station 17 via SMSC/MMSC/CMSC 33. The message may also be delivered to the secondary device (e.g., PC 31) of the customer via the Internet 29. Alternatively or additionally, some notifications may entail receipt of a mobile messaging service message (e.g., SMS, MMS, and RCS) from a mobile station (e.g., mobile station 17) to the primary device (e.g., mobile station 13) of the customer. The message may be delivered to the primary device via a mobile message service center. The message may also be delivered to the secondary device of the customer via the Internet 29.

Wireless carriers developed the short message service ("SMS") to transmit text messages for display on mobile stations. In many existing network architectures, the SMS traffic uses the signaling portion of the network 21 to carry message traffic between SMSC/MMSC/CMSC 33 and the mobile stations. The SMSC 33 supports mobile station to mobile station delivery of text messages. However, the SMSC 33 also supports communication of messages between the mobile stations and devices coupled to other networks. For example, the SMSC 33 may receive incoming IP message packets from the Internet 29 for delivery via the network 21 from one of the BSs 19 to a destination mobile station. For this later type of SMS related communications, the network 10 also includes one or more Short Message Peer-to-Peer (SMPP) protocol gateways 34. The SMPP gateway provides protocol conversions, between SMPP as used by the SMSC 33 and the protocols used on the Internet 29 or other IP network. SMPP messages ride on IP transport, e.g., between the gateway 34 and the SMSC 33.

Of note for purposes of this discussion, the mobile communication network 10 supports MA services to enable the subscriber to send and receive a mobile messaging service message (e.g., SMS, MMS, and RCS) on the subscriber's primary device (e.g., the mobile station 13) and the subscriber's secondary device (e.g., the PC 31). To this end, the mobile communication network 10 includes MA server 61. The MA server 61 is in communication with the mobile stations 13, 17 through the private network 35, SMSC/MMSC/CMSC 33, and mobile traffic network 21. The MA server 61 is in communication with the secondary device (e.g., PC 31) through the private network 35 and the Internet 29.

In practice today, a carrier may also offer its subscribers on-line access to a variety of functions related to the subscribers' accounts, such as review of billing statements and usage data, on-line payment, subscription changes, password control or the like. For that purpose, the carrier in the example shown in FIG. 1 operates a customer account web server 43, offering a 'My Account'-type subscriber interface via the Internet. 'My Account'-type subscribe interface provides a login mechanism for distinguishing an authorized customer and allowing the customer to access on-line information about the customer's account. In one example, the one-line information displays the subscribed services for the customer (e.g., the MA services), the amount of data usage and the account balance of the customer. Hence, a user's terminal, such as PC 31, may be used to access on-line information about a subscriber's account, which the mobile carrier makes available via the carrier's 'My Account' web site accessible through the Internet 29.

Of note for purposes of the present discussions of notifications, the web site provides the customer with the ability to subscribe to the MA services offered by the MA server 61. Upon successful subscription, the MA server 61 updates the system of record 39 to reflect customer's subscription to the MA service. The MA server 61 also provisions SMSC/MMSC/CMSC 33 by at least informing the SMSC/MMSC/CMSC 33 of the identities of customers who have subscribed to the MA services. In one example, the MA server 61 sends a list of MDNs associated with the MA subscribers to the SMSC/MMSC/CMSC 33. In one example, the MA server 61 informs the SMSC/MMSC/CMSC 33 immediately after the customer subscribes to the MA services or the customer changes his/her previous subscription. In another example, the MA server 61 waits for a predetermined amount of time (e.g., 24 hours) and then updates the SMSC/MMSC/CMSC 33 with the MDNs of the customers who have subscribed to the MA services within the predetermined amount of time (e.g., past 24 hours). In yet another implementation, the MA server 61 waits until the number of new customers subscribing to the MA services reaches a particular threshold and then the MA server 61 updates the record at the SMSC/MMSC/CMSC 33.

In either case, the SMSC/MMSC/CMSC 33 uses the list to identify whether the destination and/or the source mobile station of the mobile messaging service message (e.g., SMS, MMS, and RCS) has been provisioned for MA services. If the destination mobile station is provisioned for the MA services, the SMSC/MMSC/CMSC 33 forwards the message to the destination mobile station (e.g., the mobile station 13) and also forwards a copy of the message to the MA server 61, which enables delivery of the message to the secondary device (e.g., the PC 31) associated with the destination mobile station. If the source mobile station is also provisioned for the MA services, the MA server 61 may send a synchronization request to any secondary device associated with the source mobile station to update the sent folder of the secondary device. In one example, the synchronization request triggers the synchronization of the secondary device to download a copy of sent message from the MA server 61. In another example, the synchronization request notifies the user of the secondary device that synchronization is necessary. In response, the user may utilize the secondary device to contact the MA server 61 and download a copy of the sent message.

With that overview of the system, it may be helpful now to consider a high-level discussion of an example of a customer subscribing to the MA services and utilizing the MA services to send and receive a mobile messaging service message (e.g., SMS, MMS, and RCS) on both the primary device and the secondary device associated with a single MDN. As noted above, the MA services may be implemented by the MA server 61 in the mobile communication network. To this end and to subscribe to the MA service, the customer may use one of the following approaches. The MA server 61 may be indirectly accessed by the customer or the CSR. For example, the customer may indirectly access the MA server 61 via a 'My Account' or 'My Business' application on the website server 43. The 'My Account' application allows the customer to perform self-service functionality on his/her accounts and may be accessed via the PC 31. The 'My Business' application allows business customers to perform self-service functionality on their accounts.

The customer may use the PC 31 (or a web-enabled mobile station, etc.) to log into the customer's account via the site offered by the website server 43 to subscribe to the MA services. In one example of operation, the customer may use their user ID and password to log into their own account page at the carrier's website, after which, the customer can subscribe to the MA services. For example, an MA service link is presented on 'My Account' or 'My Business' page of the customer and when activated automatically registers the customer for the MA services. The selection of the link may send a message to the MA server 61 with the information about customer. The information may include the MDN, the user ID and password, account number, etc. The MA server 61 receives this information and updates the system of record 39 to reflect the customer's subscription to the MA services. The MA server 61 also provisions the SMSC/MMSC/CMSC 33 by at least informing SMSC/MMSC/CMSC 33 of the identity of the MDN of the customer registered for the MA services.

In another example, a customer calls a CSR to subscribe to MA service. The call may be from the mobile station or from another telephone. When the call is established, the CSR (or an Interactive Voice Response ("IVR")) explains the MA benefits and asks the caller to accept the MA services (for example, press 1 for yes and press 2 for no). Assuming this customer interaction is performed by the IVR, the acceptance (or rejection) information is passed to CSR. If the MA services are accepted, the next available CSR initiates the MA profiling. To this end, the CSR updates the system of record 39 and also provisions MA server 61. The MA server 61 in turn provisions the SMSC/MMSC/CMSC 33.

Once subscription to the MA services is completed, the MA server 61 sends a notification request to the SMSC/MMSC/CMSC 33 to inform the SMSC/MMSC/CMSC 33 of customers who have subscribed to the MA services. In one example, MA server 61 sends to the SMSC/MMSC/CMSC 33 a list of MDNs associated with the MA subscribers. The MA server 61 may also maintain a list of customers who have subscribed to the MA services. The list may identify the customers by user ID and/or MDN.

In keeping with the previous example, assume the mobile station 13 is a primary device of a customer who has subscribed to the MA services and the PC 31 is a secondary device of the same customer. Further assume that the mobile station 17 belongs to another customer who has not yet subscribed to the MA services. When a mobile messaging service message (e.g., SMS, MMS, and RCS) is sent to the primary device (e.g., the mobile station 13) of the customer from another mobile station (e.g., mobile station 17), the message is received at the SMSC/MMSC/CMSC 33 through the mobile traffic network 21. The SMSC/MMSC/CMSC 33 identifies that the destination mobile station (e.g., the mobile station 13) subscribes to the MA services by, for example, referencing the list the SMSC/MMSC/CMSC 33 received from the MA server 61. As a result, in addition to delivering the message to the destination mobile station (e.g., the mobile station 13), the SMSC/MMSC/CMSC 33 also delivers a copy of the message to the MA server 61. The MA server 61 in turns allows for a copy of the message to be delivered to the secondary device (e.g., the PC 31). The interface between the MA server 61 and the secondary device can use HTTP, IMAP, or other appropriate protocols.

The delivery to the secondary device (e.g., PC 31) may be realized when the customer uses the secondary device to log into the mobile communication network. To illustrate, the customer utilizes the browser on the PC 31 to log into the customer's account on the mobile communication network 21. Upon successful authentication, an HTTP session is established between the browser on the PC 31 and the MA server 61. The HTTP session may persist as long as the browser on the PC 31 is logged into the network 21. During the HTTP session, the browser periodically makes an HTTP pull request to the MA server 61. In response, the MA server 61 pushes the new message to the browser on PC 31 for display to the user. In a slightly different implementation, the MA server 61 may automatically push the message to the browser on the PC 31 upon determination that the browser on the PC 31 is logged into the network 21 and the HTTP session is established.

Figure 2:
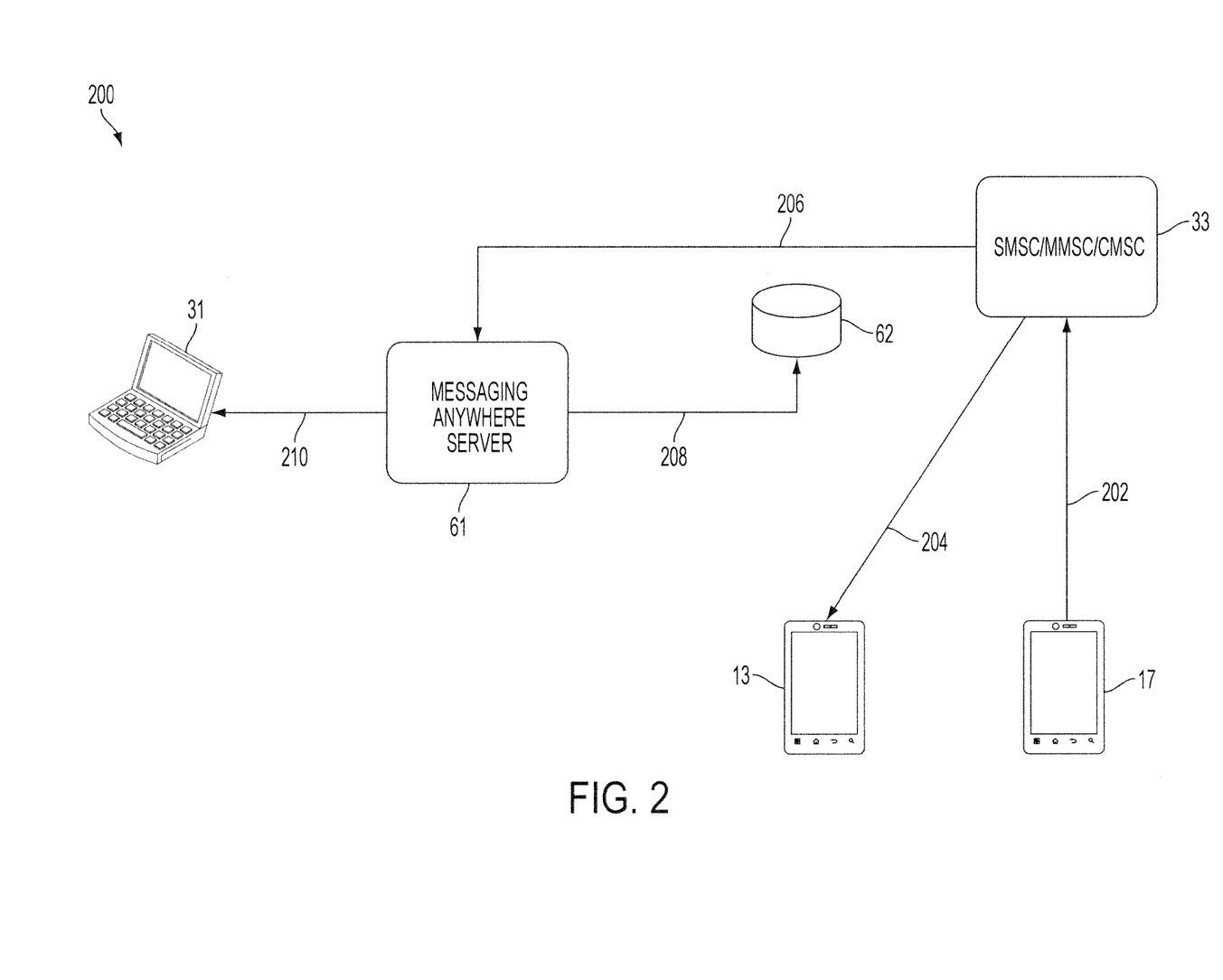
FIG. 2 illustrates an exemplary flow for allowing a delivery of a mobile messaging service message from a mobile station to a primary device and a secondary device of a customer.

FIG. 2 illustrates a flow 200 for allowing a delivery of a mobile messaging service message from a mobile station to a primary device and a secondary device of a customer. In keeping with the previous example, the flow 200 includes some of the same components shown and described with respect to the mobile communication network 10 in FIG. 1. In particular, the flow 200 includes the mobile stations 13, 17, the SMSC/MMSC/CMSC 33, the MA server 61, and the PC 31. Therefore, for the sake of brevity, these components are not described in more detail here.

The flow 200 begins with SMSC/MMSC/CMSC 33, which supports mobile station to mobile station delivery of a mobile messaging service message, receiving a mobile messaging service message (Step 202) from a mobile station 17. The mobile messaging service message includes a SMS, a MMS, and/or a RCS message. The SMSC/MMSC/CMSC 33 identifies a mobile station destination associated with the received message. The destination mobile station has a first MDN and corresponds to a primary device of a customer of a mobile communication network provider. In keeping with the previous example described with respect to FIG. 1, the primary device includes the mobile station 13 of the customer. The SMSC/MMSC/CMSC 33 may identify the primary device 13 based on the first MDN included in the message.

The SMSC/MMSC/CMSC 33 delivers the received message to the primary device 13 of the customer (Step 204). The SMSC/MMSC/CMSC 33 also determines whether the destination mobile station 13 and/or the originating mobile station 17 subscribe to the MA service. If either one does, the SMSC/MMSC/CMSC 33 forwards the message to the MA server 61. In keeping with the previous example, it is assumed that the mobile station 13 subscribes to the MA service; whereas, the mobile station 17 does not subscribe to the MA service. The subscription to the MA service may result from one of the methods described with respect to FIG. 1. For example, the customer may have self-subscribed to the MA service by using a browser on the customer's PC 31 to access the customer's account on the mobile communication network 10. For another example, the customer may have subscribed to the MA service by using an MA client stored on the primary device 13. In either case, upon subscription, records at SMSC/MMSC/CMSC 33 are updated to reflect the customer's subscription to the MA service. For example, a table at the SMSC/MMSC/CMSC 33 is updated to include the MDN of the primary device 13 in the table.

Upon determination that the customer subscribes to the MA service, the SMSC/MMSC/CMSC 33 delivers a copy of the received message to the MA server 61 (Step 206). The MA server 61 receives the message and stores the message in a Message Store database 62 (Step 208). The MA server 61 also delivers the message to a secondary device of the customer (Step 210). In keeping with the previous example, the secondary device includes a PC 31 of the customer. The MA server 61 delivers the message to the PC 31 when PC 31 establishes a communication session with the MA server 61 at the mobile communication network. For example, an HTTP session is established between the browser on the PC 31 and the MA server 61 when the customer utilizes PC 31 to log into the network 10. Then, the browser sends an HTTP pull request to the MA server 61. In response, the MA server 61 pushes the new message to the browser on PC 31 for display to the user.

In another example, the secondary device includes another mobile station (e.g., an iPad) having installed thereon an MA application. The activation of the MA application may result in establishment of a session between the MA application and the MA server 61 after a successful authentication. The MA server 61 recognizes the secondary device is associated with the primary device based on the MDN obtained from the authentication information provided by the customer. When the MA messaging client is not running on the front end of the secondary device, the MA messaging client is suspended. Therefore, the MA server 61 may send the secondary device a push notification. The customer clicks on the push notification, which brings up the MA messaging client and enables retrieval of the message from the MA server 61.

The MA server 61 also determines whether the mobile station 17 from which the message was received subscribes to the MA service. In keeping with the previous example, it is assumed that the mobile station 17 does not subscribe to the MA service. Therefore, the MA server 61 does not deliver the message to a secondary device that is associated with the mobile station 17. If the user of the mobile station 17 subsequently subscribes to the MA service, the records at MA server 61 are updated. The MA server 61 also updates the record at the SMSC/MMSC/CMSC 33 and enables delivery of new messages (e.g., messages following the subscription) to the secondary device of the user of the mobile station 17. For example, the MA server 61 may send a synchronization message to the secondary device to update the sent messages stored in the secondary device to include the newly sent message from the mobile station 17. The interface between the MA server 61 and the secondary device can use a HTTP, IMAP, or other appropriate protocol.

Figure 3:
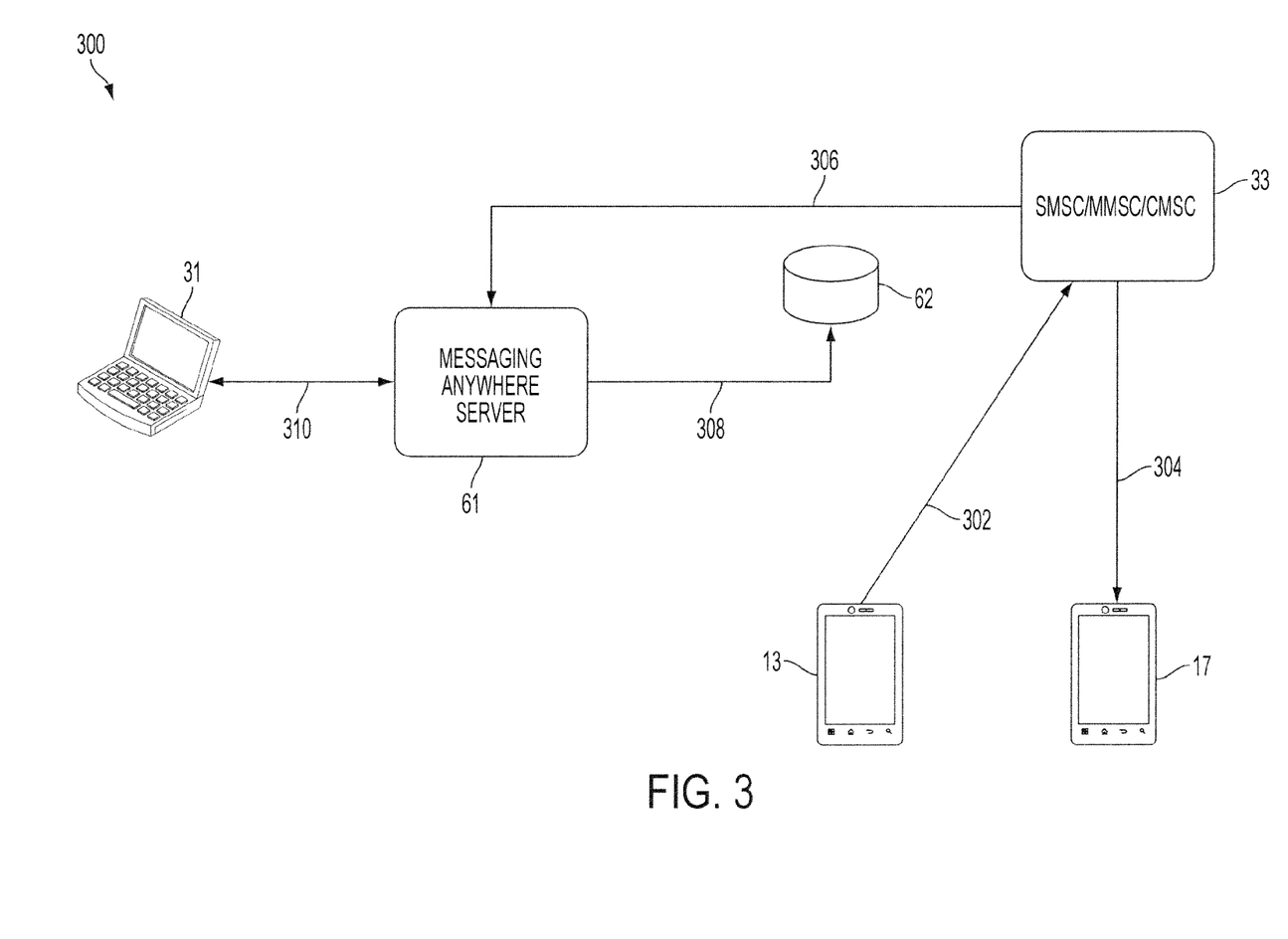
FIG. 3 illustrates an exemplary flow for allowing a delivery of a mobile messaging service message from a primary device of a customer to a mobile station and to a secondary device of the customer.
Figure 4:
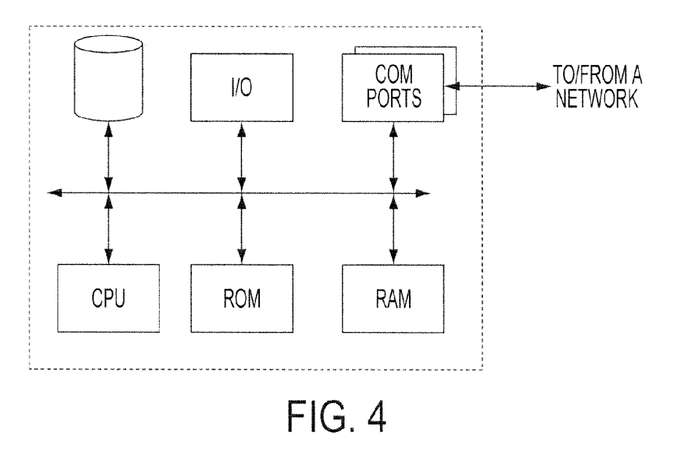
FIG. 4 is a simplified functional block diagram of a computer that may be configured as a host or server, for example, to function as the MA server in the system of FIG. 1.

The delivery to the secondary device (e.g., PC 31) may be realized when the customer uses the secondary device to log into the mobile communication network 21. To illustrate, the customer utilizes the browser on the secondary device to log into the customer's account on the mobile communication network 21. Upon successful authentication, an HTTP session is established between the browser on and the MA server 61. The HTTP session may persist as long as the browser on the secondary device is logged into the network 21. During the HTTP session, the browser periodically makes an HTTP pull request to the MA server 61. In response, the MA server 61 pushes the new message to the browser on the secondary device for display to the user. In a slightly different implementation, the MA server 61 may automatically push the message to the browser on the secondary device upon determination that the browser on the secondary device is logged into the network 21 and the HTTP session is established FIG. 3 illustrates an exemplary flow 300 for allowing a delivery of a mobile messaging service message from a primary device 13 of a customer to a mobile station 17 and to a secondary device 31 of the customer. In keeping with the previous example, the flow 300 includes some of the same components shown and described with respect to the mobile communication network 10 in FIG. 1. In particular, the flow 300 includes the mobile stations 13, 17, the SMSC/MMSC/CMSC 33, the MA server 61, and the PC 31. Therefore, for the sake of brevity, these components are not described in more detail here.

The flow 300 begins with the primary device 13 of the customer sending a mobile messaging service message to the SMSC/MMSC/CMSC 33 (Step 302). The SMSC/MMSC/CMSC 33 identifies a destination mobile station associated with the received message. In this case, the destination mobile station corresponds to the mobile station 17. The SMSC/MMSC/CMSC 33 delivers the received message to the mobile station 17 (Step 304).

The SMSC/MMSC/CMSC 33 also determines whether the originating mobile station 13 and/or the destination mobile station 17 subscribes to the MA service. If either one does, the SMSC/MMSC/CMSC 33 forwards the message to the MA server 61. In keeping with the previous example, it is assumed that the mobile station 13 subscribes to the MA service; whereas, the mobile station 17 does not subscribe to the MA service. Upon determination that the mobile station 13 subscribers to the MA service, the SMSC/MMSC/CMSC 33 delivers a copy of the received message to the MA server 61 (Step 306). The MA server 61 receives the message and stores the message in the Message Store database 62 (Step 308). The MA server 61 also notifies the secondary device 31 of the customer to synchronize with the MA server 61 for retrieving a copy of the message sent from the primary device 13 (Step 310). In this manner, the sent folder of both the primary device 13 and the secondary device 31 remain up to date.

As shown by the above discussion, functions relating to the MA service may be implemented on computers connected for data communication via the components of a packet data network, operating as an MA server 61 and/or as an SMSC/MMSC/CMSC 33 as shown in FIG. 1. Although special purpose devices may be used, such devices also may be implemented using one or more hardware platforms intended to represent a general class of data processing device commonly used to run "server" programming so as to implement the MA functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the MA services. The software code is executable by the general-purpose computer that functions as the MA server 61. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling retrieval of a mobile messaging service message from multiple devices associated with a single mobile directory number, in essentially the manner performed in the implementations discussed and illustrated herein.

Figure 5:
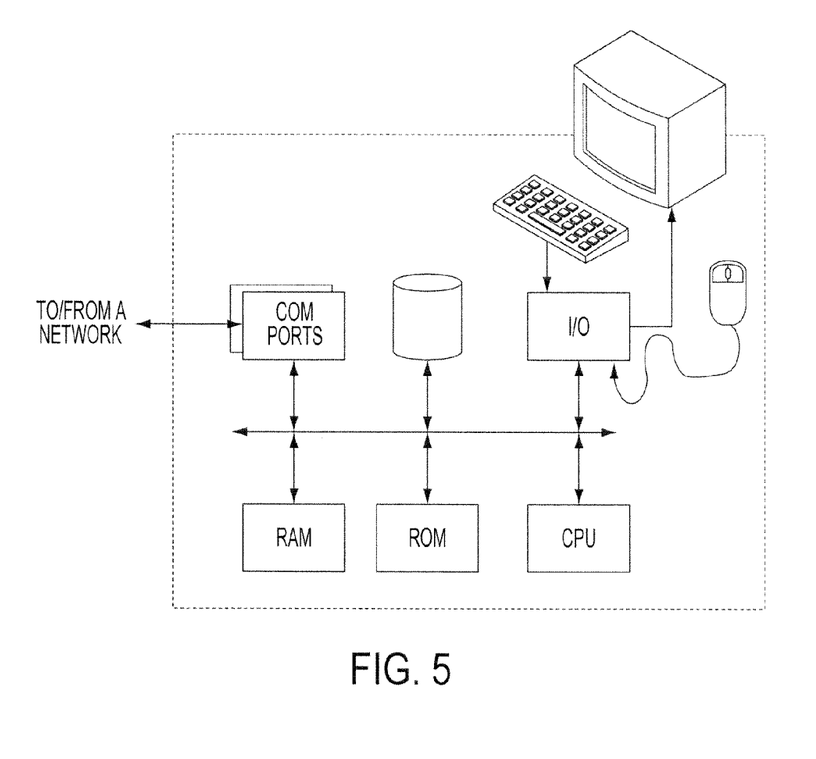
FIG. 5 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of enabling retrieval of a mobile messaging service message from multiple devices associated with a single mobile directory number outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network provider into the computer platform of the mobile communication network provider that will be the MA server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like may be used to implement the MA server shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
receiving, through a mobile traffic network and at a mobile messaging service center, a mobile messaging service message;
identifying a destination mobile station associated with the received message, the destination mobile station having a first Mobile Directory Number (MDN) and corresponding to a primary device of a customer of a mobile communication network provider;
delivering, through the mobile communication network and from the mobile messaging service center, the received message to the primary device of the customer;
determining whether the customer subscribes to a Messaging Anywhere (MA) service;
upon determination that the customer subscribes to the MA service, delivering, from the mobile messaging service center, a copy of the received message to an MA server; and
delivering, from the MA server, the message to a secondary device previously identified by the customer.

2. The method of claim 1, wherein:
the primary device includes a mobile station of the customer, and
the secondary device includes a personal computer of the customer connected with the mobile communication network.

3. The method of claim 1, wherein:
the mobile messaging service message includes a Short Message Service (SMS), a Multimedia Messaging Service (MMS), and/or a Rich Communication Suite (RCS) message; and
the mobile messaging service center includes a Short Message Service Center (SMSC), a Multimedia Message Service Center (MMSC), and/or a Converged Message Service Center (CMSC).

4. The method of claim 1, wherein the secondary device is a device of the customer.

5. The method of claim 1, further comprising steps of:
receiving a subscription request from the customer to subscribe to the MA service; and
in response to receiving the subscription request, provisioning at least one of the MA server or the mobile messaging service center to permit the customer to utilize the MA service.

6. The method of claim 5, wherein the provisioning includes updating records at the MA server and the mobile messaging service center to reflect the customer's subscription to the MA service.

7. The method of claim 1, wherein receiving the mobile messaging service message includes receiving the mobile messaging service message from a mobile device having a second MDN, the method further comprising steps of:
determining whether a user of the mobile device having the second MDN subscribes to the MA service; and
only if it is determined that the user of the mobile device subscribes to the MA service, enabling delivery of the message to a secondary device of the user from the MA server.

8. The method of claim 1, further comprising enabling the customer to self-provision to the MA service by using a browser on a personal computer of the customer to access an account of the customer on the mobile communication network provider.

9. The method of claim 8, wherein further comprising enabling the customer to self-provision to the MA service by using an MA client stored on the primary device of the customer.

10. The method of claim 1, wherein delivering the message to the secondary device includes delivering the message to the secondary device when the secondary device establishes a communication session with the MA server at the mobile communication network and the communication session is established when the customer utilizes the secondary device to log into customer's account on the mobile communication network.

11. The method of claim 10, wherein the session is established when the customer activates an MA client on the secondary device.

12. The method of claim 1, further comprising:
receiving, from the primary device and at the mobile messaging service center, a mobile messaging service message;
identifying a destination mobile station associated with the received message from the primary device, the destination mobile station having a second MDN;
delivering, through the mobile communication network and from the mobile messaging service center, the received message to the destination mobile station having the second MDN;
determining whether a user associated with the destination mobile station having the second MDN subscribes to the MA service;
upon determination that the user subscribes to the MA service, delivering, from the mobile messaging service center, a copy of the received message to the MA server; and
delivering, from the MA server, the message to a secondary device of the user.

13. The method of claim 12, further comprising notifying the secondary device of the customer to synchronize with the MA server for retrieving a copy of the message sent from the primary device.

14. The method of claim 1, further comprising:
receiving, from the secondary device and the MA server, a mobile messaging service message;
identifying a destination mobile station associated with the received message from the secondary device, the destination mobile station having a second MDN;
delivering, through the mobile communication network and from the MA server, the received message from the secondary device to the mobile message service center to be delivered to the destination mobile station having the second MDN; and
notifying the primary device of the customer to synchronize with the MA server for retrieving a copy of the message sent from the secondary device.

15. A system comprising:
a mobile message service center supporting mobile station to mobile station delivery of a mobile messaging service message, the mobile message service center including a processing device and a memory storing executable instructions for causing the processing device to: (i) receive the mobile messaging service message; (ii) identify a mobile station destination associated with the received message, the destination mobile station having a first Mobile Directory Number (MDN) and corresponding to a primary device of a customer of a mobile communication network provider; (iii) deliver, through the mobile communication network and from the mobile messaging service center, the received message to the primary device of the customer; and (iv) determine whether the customer subscribes to a Messaging Anywhere (MA) service; and
an MA server including a processing device and a memory storing executable instructions for causing the processing device to: (i) receive a copy of the message from the mobile messaging service center upon determination that the customer subscribes to the MA service; (ii) deliver, from the MA server, the message to a secondary device of the customer.

16. The system of claim 15, wherein:
the primary device includes a mobile station of the customer, and
the secondary device includes a personal computer of the customer being connected with the mobile communication network.

17. The system of claim 15, wherein:
the mobile messaging service message includes a Short Message Service (SMS, a Multimedia Messaging Service (MMS), and/or a Rich Communication Suite (RCS) message; and
the mobile messaging service center includes a Short Message Service Center (SMSC), a Multimedia Message Service Center (MMSC), and/or a Converged Message Service Center (CMSC).

* * * * *